United States Patent
Schubert

(10) Patent No.: US 9,309,955 B2
(45) Date of Patent: Apr. 12, 2016

(54) METHOD FOR STARTING UP A VEHICLE HAVING A HYDROSTATIC ADDITIONAL DRIVE, AND VEHICLE HAVING A HYDROSTATIC ADDITIONAL DRIVE

(75) Inventor: Peter Schubert, Leingarten (DE)

(73) Assignee: Robert Bosch GmbH, Stuttgart (DE)

( * ) Notice: Subject to any disclaimer, the term of this patent is extended or adjusted under 35 U.S.C. 154(b) by 301 days.

(21) Appl. No.: 14/004,494

(22) PCT Filed: Feb. 10, 2012

(86) PCT No.: PCT/EP2012/000598
§ 371 (c)(1),
(2), (4) Date: Dec. 20, 2013

(87) PCT Pub. No.: WO2012/123057
PCT Pub. Date: Sep. 20, 2012

(65) Prior Publication Data
US 2014/0100079 A1    Apr. 10, 2014

(30) Foreign Application Priority Data

Mar. 12, 2011    (DE) .......................... 10 2011 013 769

(51) Int. Cl.
*F16H 61/47*    (2010.01)
*F16H 39/00*    (2006.01)
(Continued)

(52) U.S. Cl.
CPC .............. *F16H 39/00* (2013.01); *B60K 7/0015* (2013.01); *B60K 17/10* (2013.01); *B60K 17/356* (2013.01); *B60W 10/06* (2013.01); *F16H 61/431* (2013.01); *F16H 61/47* (2013.01); *B60K 2007/0038* (2013.01); *B60K 2007/0092* (2013.01);
(Continued)

(58) Field of Classification Search
None
See application file for complete search history.

(56) References Cited

U.S. PATENT DOCUMENTS 4,444,286 A    4/1984    Hawkins et al.
4,480,502 A    11/1984    Nembach
(Continued)

FOREIGN PATENT DOCUMENTS

DE    33 31 651 C1    5/1985
DE    41 10 161 A1    10/1992
(Continued)

OTHER PUBLICATIONS

International Search Report corresponding to PCT Application No. PCT/EP2012/000598, mailed Apr. 17, 2012 (German and English language document) (5 pages).

*Primary Examiner* — Justin Holmes
(74) *Attorney, Agent, or Firm* — Maginot, Moore & Beck LLP

(57) ABSTRACT

A method for starting up a vehicle includes driving a first wheel with an internal combustion engine vehicle drive and driving a second wheel with a hydrostatic additional drive. The hydrostatic additional drive has an adjustable hydraulic pump driven by the internal combustion engine, and at least one hydraulic motor coupled hydraulically thereto. The method further includes increasing and regulating a supply pressure of the at least one hydraulic motor in dependence on an accelerator pedal; determining a non-zero rotational speed of the first wheel; and synchronizing a rotational speed of the second wheel with the determined rotational speed of the first wheel. The method further includes increasing and regulating a supply pressure of the at least one hydraulic motor in dependence on an accelerator pedal; determining a non-zero speed of the vehicle; and adapting a rotational speed of the second wheel to the determined speed.

15 Claims, 2 Drawing Sheets

(51) Int. Cl.
  *B60K 17/356* (2006.01)
  *F16H 61/431* (2010.01)
  *B60K 7/00* (2006.01)
  *B60K 17/10* (2006.01)
  *B60W 10/06* (2006.01)
  *F16H 59/18* (2006.01)
  *F16H 59/44* (2006.01)

(52) U.S. Cl.
  CPC ............ *B60W2720/28* (2013.01); *F16H 59/18* (2013.01); *F16H 59/44* (2013.01); *Y10T 477/631* (2015.01)

(56) References Cited

U.S. PATENT DOCUMENTS

| | | | |
|---|---|---|---|
| 5,564,519 A | 10/1996 | Katoh et al. | |
| 5,687,808 A * | 11/1997 | Watanabe | B60K 17/356 180/242 |
| 6,719,080 B1 * | 4/2004 | Gray, Jr. | B60K 6/12 180/165 |
| 2003/0136593 A1 * | 7/2003 | Vuksa | B60K 41/26 180/53.6 |
| 2005/0016167 A1 * | 1/2005 | Singh | B60K 6/12 60/413 |
| 2006/0197375 A1 * | 9/2006 | Delaney | B60K 6/12 303/20 |
| 2011/0024222 A1 * | 2/2011 | Honzek | B60K 6/36 180/365 |
| 2012/0065854 A1 * | 3/2012 | Stoller | F16H 61/702 701/60 |
| 2012/0130600 A1 * | 5/2012 | Thomson | E02F 9/2025 701/50 |

FOREIGN PATENT DOCUMENTS

| | | |
|---|---|---|
| DE | 42 12 983 C1 | 5/1993 |
| EP | 1 002 685 A2 | 5/2000 |

* cited by examiner

METHOD FOR STARTING UP A VEHICLE HAVING A HYDROSTATIC ADDITIONAL DRIVE, AND VEHICLE HAVING A HYDROSTATIC ADDITIONAL DRIVE

This application is a 35 U.S.C. §371 National Stage Application of PCT/EP2012/000598, filed on Feb 10, 2012, which claims the benefit of priority to Ser. No. DE 10 2011 013 769.6, filed on Mar 12, 2011 in Germany, the disclosures of which are incorporated herein by reference in their entirety.

BACKGROUND.

The disclosure relates to a method for starting up a vehicle having a hydrostatic additional drive and a corresponding vehicle having a hydrostatic additional drive.

In vehicles which are used on a substrate with low traction and/or with significant inclinations, for example lorries on building sites, it is known from the prior art to engage a hydrostatically driven front axle with a conventionally mechanically driven rear axle of the vehicle.

The publication DE 42 12 983 C1 and the publication DE 10 161 C2 each set out such a drive concept, in which an internal combustion engine mechanically drives, on the one hand, a rear axle and in addition a variable displacement pump. Hydraulic motors of the respective front wheels can be driven by the variable displacement pump.

The publication DE 41 10 161 C2 further discloses that the pressure control of the hydrostatic additional drive and consequently the torque control of the front wheels, together with the torque control of the rear wheels, is carried out by means of an accelerator pedal of the vehicle. This control is carried out at the same time for the rear wheels by means of the internal combustion engine and for the front wheels by means of a pressure control valve of the hydrostatic additional drive. In this instance, pressure medium can be conveyed to the hydraulic motors only when a gear output shaft is rotated. Consequently, when starting up, "fast running" of the rear axle is possible, which may lead to a loss of the lateral guiding and to an unstable travel state. It is further possible, when the rear wheels are already slipping, for it no longer to be possible to start up the vehicle in spite of the additionally produced drive torque of the front wheels.

In this regard, an object of the disclosure is to provide a method for starting up a vehicle having a hydrostatic additional drive and a corresponding vehicle having a hydrostatic additional drive, whose start-up behavior is stabilized.

SUMMARY

This object is achieved with methods for starting up a vehicle having a hydrostatic additional drive having the features of the disclosure or by a vehicle having a hydrostatic additional drive having the features of the disclosure.

A first variant of the method according to the disclosure for starting up —in particular from a standing start —relates to a vehicle which has a vehicle drive having an internal combustion engine for driving a first wheel or a first axle and a hydrostatic additional drive for driving a second wheel or a second axle. The hydrostatic additional drive has an adjustable hydraulic pump which is driven by the internal combustion engine and at least one hydraulic motor which is hydraulically coupled thereto. The first variant of the method according to the disclosure has the steps of:

in particular first increasing and then controlling a supply pressure of the at least one hydraulic motor in accordance with an accelerator pedal;

establishing a speed which is not equal to zero of the first wheel or the first axle —in particular at the rear—; and synchronizing a speed of the second wheel or the second axle —in particular at the front —with the established speed of the first wheel or the first axle.

A second variant of the method according to the disclosure for starting up —in particular from a standing start —with a vehicle described above has the steps of:

in particular first increasing and then controlling a supply pressure of the at least one hydraulic motor in accordance with an accelerator pedal;

establishing a speed of the vehicle which is not equal to zero; and adapting a speed of the second wheel or the second axle —in particular at the front —to the established speed.

With both variants of the method according to the disclosure, therefore, when starting up, a torque setting for the second wheel or the second axle is first established and the second wheel is driven, without taking into account the driving of the first wheel or the first axle. The start-up behavior of the vehicle is thus stabilized in this first operating state. It is established whether the vehicle has begun to move. Only after the vehicle has begun to move are the drives of the two wheels or the two axles adapted to each other in a second operating state.

Other advantageous embodiments of the disclosure are described in the dependent patent claims.

The establishment of the speed in the second variant of the method according to the disclosure is preferably carried out by means of an anti-lock braking system (ABS) on the first wheel.

The increase or control of the supply pressure is preferably carried out in accordance with an angle of the accelerator pedal.

The increase or control of the supply pressure is preferably carried out by adjusting a pivot angle of the hydraulic pump.

In order to achieve the subsequent desired speed in the most precise manner possible, in vehicles having an automatic gear mechanism, it is preferable for a precontrol or adjustment of the pivot angle of the hydraulic pump to be carried out beforehand in accordance with an adjusted speed range of an automatic gear mechanism.

The vehicle according to the disclosure has a vehicle drive having an internal combustion engine for driving a first wheel or a first axle and a hydrostatic additional drive for driving a second wheel or a second axle. The hydrostatic additional drive has an adjustable hydraulic pump which is driven by the internal combustion engine and a hydraulic motor which is hydraulically coupled thereto. A supply pressure of the hydraulic pump can be controlled in accordance with an accelerator pedal and furthermore in accordance with a velocity sensor system or speed sensor system which is arranged on the first wheel or on the first axle, in particular at the rear. Consequently, when the vehicle is started up, a torque setting for the second wheel or the second axle can first be established without taking into account the first wheel or the first axle. The start-up behavior of the vehicle is thus stabilized in a first operating state until a speed is established at the first wheel or the first axle.

In a particularly preferred development of the vehicle according to the disclosure having an anti-lock braking system (ABS), in order to minimize the technical complexity of the device, the velocity sensor system or the speed sensor system of the anti-lock braking system is used.

In a particularly preferred application, the vehicle is a lorry.

BRIEF DESCRIPTION OF THE DRAWINGS

An embodiment of the disclosure is described in detail below with reference to the FIGS. in which.

DETAILED DESCRIPTION

Figure 1:
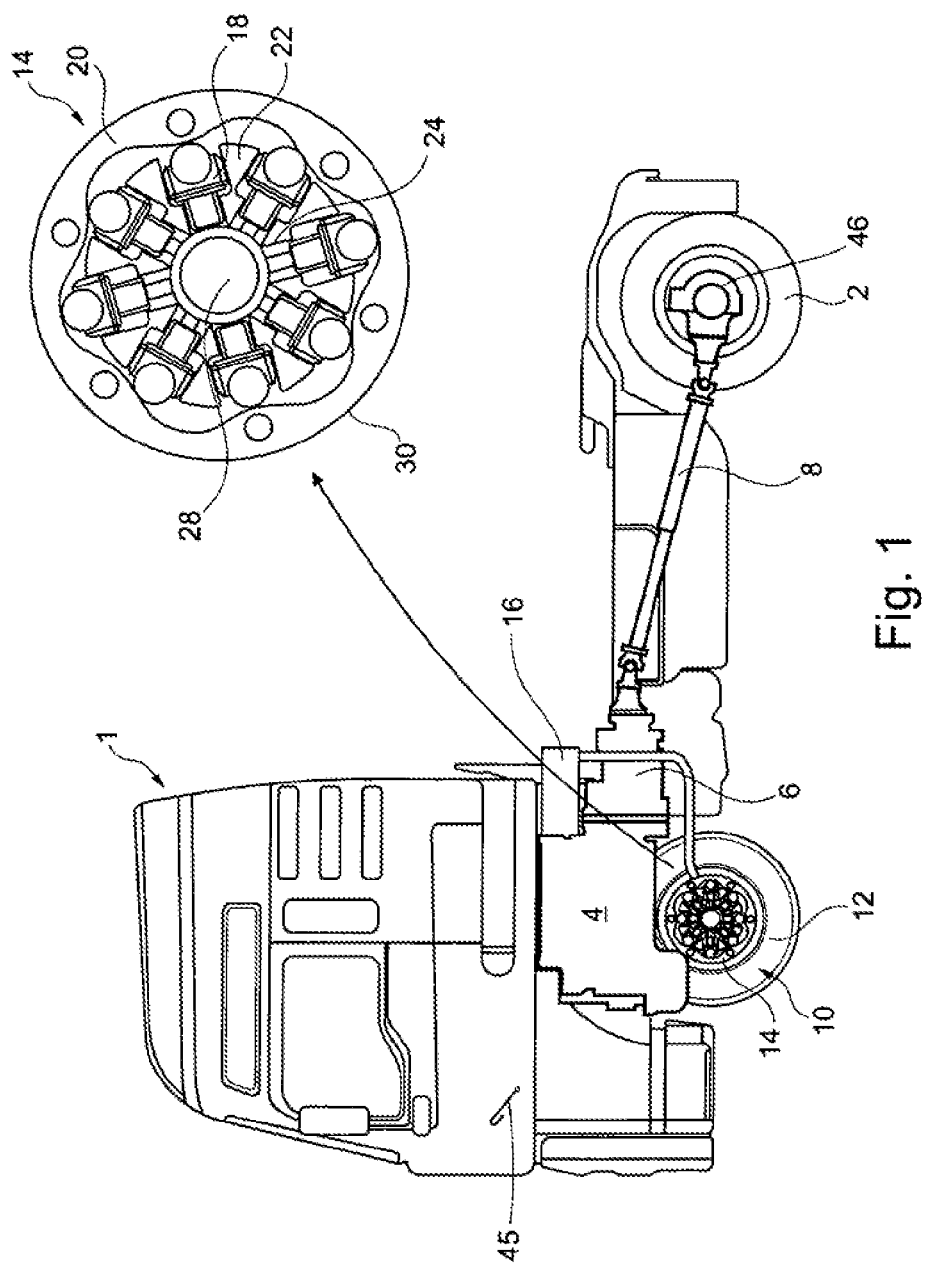
FIG. 1 is a schematic drawing of a lorry according to the disclosure having a hydrostatic additional drive.

FIG. 1 is a highly schematic illustration of a lorry whose rear wheels 2 are driven by means of a conventional mechanical drive train with an internal combustion engine 4, gear mechanism 6, cardan shaft 8 and differential gear, etcetera. The lorry 1 is constructed with a hydrostatic additional drive 10 which may optionally be engaged, for example, on difficult terrain. This hydrostatic additional drive 10 has for each of the front wheels 12 a hydraulic motor 14 which is supplied with pressure medium via a pump unit 16 which is driven by the internal combustion engine 4.

According to the enlarged partial cutout of one of the two hydraulic motors 14 in FIG. 1, these are constructed as inverted radial piston engines, a plurality of pistons 18 being supported on a stroke ring 20.

The pistons 18 are guided in a radially adjustable manner in cylinder bores of a cylinder drum 22 and each delimit an operating chamber 24, each operating chamber 24 of this plurality of operating chambers 24 being connected one after the other to high pressure and low pressure. As a result of the resulting piston travel, the cylinder drum 22 rotates, the pistons 18 rolling on the stroke ring 20 by means of rollers 26. The cylinder drum 22 is connected to a drive shaft 28 in a rotationally secure manner, which practically forms the wheel axle of the respective front wheel 12. The hydraulic motor 14 forms a type of "wheel bearing" of the respective front wheel 12.

In the position illustrated, the pistons 18 are in abutment against the stroke ring 20 so that, when the hydrostatic additional drive 10 is not controlled or switched on and the hydraulic motors 14 are running without load, considerable friction losses may occur. In order to minimize these friction losses, the hydraulic motors 14 can be operated in a freewheel mode. To this end, a motor housing 30 which carries the stroke ring 20 is acted on with a pressure, for example a supply pressure, whilst the operating chambers 24 are acted on or relieved with the tank pressure or any lower pressure. As a result of the pressure difference, the pistons 18 are retracted in the direction towards the drive shaft 28 and consequently lifted from the stroke ring 20—the friction losses are accordingly considerably reduced.

Figure 2:
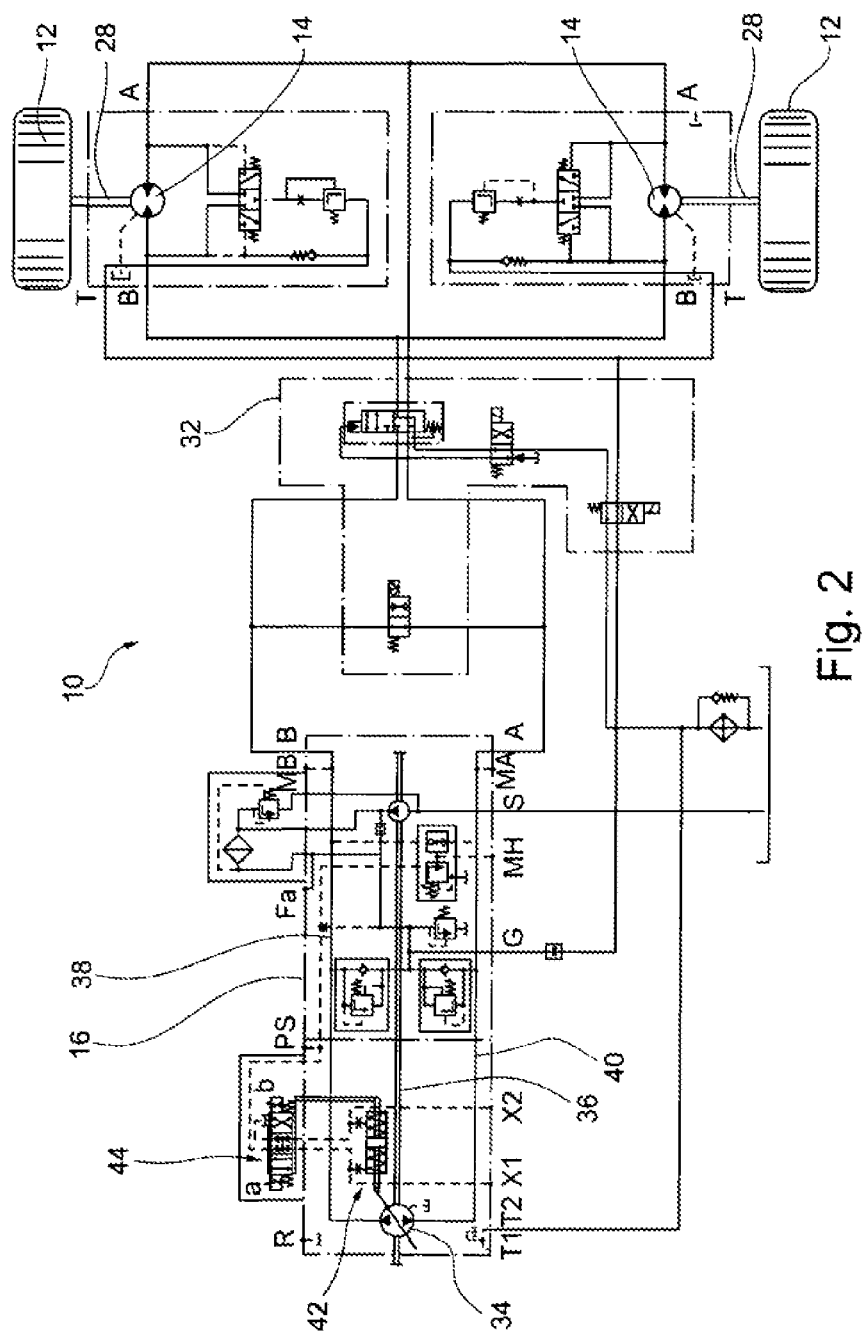
FIG. 2 is a circuit diagram of the hydrostatic additional drive according to FIG. 1.

FIG. 2 shows the circuit diagram of the hydrostatic additional drive 10 optimized according to the disclosure from FIG. 1. The two front wheels 12 can be seen and are each driven by means of a hydraulic motor 14. The pressure medium is supplied via the pump unit 16, which is hydraulically connected to the hydraulic motors 14 by means of two operating connections A, B and by means of a valve arrangement 32.

The pump unit 16 has a hydraulic pump 34 which can be pivoted through dead centre and which is driven by the internal combustion engine 4 by means of a drive shaft 36 which constitutes an auxiliary power take-off. The auxiliary power take-off may be operated at the speed of the crankshaft or at the speed of the camshaft of the internal combustion engine. In the following explanations, it is assumed that a pressure line which is located at the top (in FIG. 2) is a low-pressure line 38, whilst another pressure line which is connected to a connection of the adjustable hydraulic pump 34 is a high-pressure line 40. Depending on the control of the adjustable hydraulic pump 34, the high-pressure and low-pressure branch can be changed for braking or in order to reverse the travel direction.

There is further arranged on the drive shaft 36 a supply pump by means of which pressure medium is drawn from a tank T and can be supplied at a supply pressure, for example of from 20 to 30 bar, into the low-pressure branch of the additional drive 10.

The adjustment of the pivot angle of the adjustable hydraulic pump 34 is carried out by means of an actuation cylinder 42, whose actuator piston is connected to a pump control valve 44. The pump unit 16 is connected to a control oil supply by means of control oil connections X1, X2.

The pivot angle of the adjustable hydraulic pump 34 serves to adjust the supply pressure of the two hydraulic motors 14 and consequently to adjust the torque at the front wheels 12. According to the disclosure, when starting up in a first operating mode, a guiding variable for the control of the adjustable hydraulic pump 34 is first predetermined by a driver of the lorry by means of an accelerator pedal 45 illustrated in FIG. 1. According to the above explanations, the pressure medium is conveyed into the high-pressure line 40 and flows from the consumer, in the present case from the hydraulic motors 14 in a closed circuit via the low-pressure line 38 back to the low-pressure connection of the hydraulic pump 34.

As soon as the lorry begins to move and a speed is detected at a speed sensor (not illustrated in greater detail) of the anti-lock braking system 46 (cf. FIG. 1) of the rear wheels 2, switching is carried out into a second operating mode. This may be carried out, for example, at a speed of 3 km/h. In the second operating mode, the rear wheels 2 are synchronously controlled with the front wheels 12. The speed of the rear wheels 2 detected by means of the speed sensor acts in this instance as a desired value.

In a modification of the embodiment of the method described, a speed of the lorry 1, which is detected by means of the anti-lock braking system 46 or by means of a tachometer or a global positioning system (GPS), may also act as a desired value. According to the disclosure, switching is then carried out into the second operating mode when the lorry 1 begins to move and a speed is detected.

There are disclosed two variants of a method for starting up—in particular from a standing start—a vehicle which has a vehicle drive having an internal combustion engine for driving a first wheel or a first axle and a hydrostatic additional drive for driving a second wheel or a second axle. The hydrostatic additional drive has an adjustable hydraulic pump which is driven by the internal combustion engine and at least one hydraulic motor which is hydraulically coupled thereto.

The first variant of the method according to the disclosure has the steps of:

in particular first increasing and then
controlling a supply pressure of the at least one hydraulic motor in accordance with an accelerator pedal;
establishing a speed which is not equal to zero of the first wheel or the first axle —in particular at the rear —; and
synchronizing a speed of the second wheel or the second axle —in particular at the front —with the established speed of the first wheel or the first axle.

A second variant of the method according to the disclosure relates to the same vehicle described above and has the steps of:

in particular first increasing and then
controlling a supply pressure of the at least one hydraulic motor in accordance with an accelerator pedal;
establishing a speed which is not equal to zero; and
adapting a speed of the second wheel or the second —in particular at the front —to the established speed.

There is further disclosed the corresponding vehicle which has a vehicle drive having an internal combustion engine for driving a first wheel or a first axle and a hydrostatic additional drive for driving a second wheel or a second axle. The hydrostatic additional drive has an adjustable hydraulic pump which is driven by the internal combustion engine and a hydraulic motor which is hydraulically coupled thereto. A supply pressure of the hydraulic pump can be controlled in accordance with an accelerator pedal and furthermore in accordance with a speed sensor system or velocity sensor system which is arranged on the first wheel or on the first axle—in particular at the rear.

The invention claimed is:

1. A method for starting up a vehicle which has (i) a vehicle drive having an internal combustion engine configured to drive a first wheel or a first axle and (ii) a hydrostatic additional drive configured to drive a second wheel or a second axle, the hydrostatic additional drive having an adjustable hydraulic pump configured to be driven by the internal combustion engine and at least one hydraulic motor method comprising:

determining a speed of the first wheel or the first axle;
controlling a supply pressure of the at least one hydraulic motor in accordance with a position of an accelerator pedal when the speed of the first wheel or the first axle is determined to be in a range of zero to a predetermined speed; and
switching to a mode for controlling a speed of the second wheel or the second axle, when the speed of the first wheel or the first axle is greater than the predetermined speed.

2. The method as claimed in claim 1, wherein the supply pressure is controlled in accordance with an angle of the accelerator pedal, when the speed of the first wheel or the first axle is zero to the predetermined speed.

3. The method as claimed in claim 1, wherein the supply pressure is controlled by adjusting a pivot angle of the hydraulic pump.

4. The method as claimed in claim 3 further comprising:
precontrolling or adjusting the pivot angle of the hydraulic pump in accordance with an adjusted speed range of an automatic gear mechanism.

5. The method as claimed in claim 1, further comprising:
controlling the speed of the second wheel or the second axle independent of the position of the accelerator pedal during the mode.

6. A method for starting up a vehicle which has (i) a vehicle drive having an internal combustion engine configured to drive a first wheel or a first axle and (ii) a hydrostatic additional drive configured to drive a second wheel or a second axle, the hydrostatic additional drive having an adjustable hydraulic pump configured to be driven by the internal combustion engine and at least one hydraulic motor method comprising:

determining a speed of the vehicle;
controlling a supply pressure of the at least one hydraulic motor in accordance with a position of an accelerator pedal when the speed of the vehicle is determined to be in a range of zero to predetermined speed; and
switching to a mode for adapting a speed of the second wheel or the second axle to the Speed of the vehicle, when the speed of the vehicle is greater than the predetermined speed.

7. The method as claimed in claim 6, wherein the speed of the vehicle is established by an anti-lock braking system (ABS) on the first wheel.

8. The method as claimed in claim 6, wherein the supply pressure is controlled in accordance with an angle of the accelerator pedal, when the speed of the vehicle is zero to the predetermined speed.

9. The method as claimed in claim 6, wherein the supply pressure is controlled by adjusting a pivot angle of the hydraulic pump.

10. The method as claimed in claim 9, further comprising:
precontrolling or adjusting the pivot angle of the hydraulic pump in accordance with an adjusted speed range of an automatic gear mechanism.

11. The method as claimed in claim 6, further comprising:
adapting the speed of the second wheel or the second axle independent of the position of the accelerator pedal during the mode.

12. A vehicle, comprising:
a vehicle drive having an internal combustion engine configured to drive a first wheel or a first axle; and
hydrostatic additional drive configured to drive a second wheel or a second axle, the hydrostatic additional drive having an adjustable hydraulic pump configured to be driven by the internal combustion engine and a hydraulic motor,
wherein a supply pressure of the hydraulic pump is configured to be controlled using an accelerator pedal when a speed of the first wheel or the first axle is determined to be in range of zero to a predetermined speed, and
wherein a speed of the second wheel or the second axle is synchronized with the speed of the first wheel or the first axle or a speed of the vehicle when the speed of the first wheel or the first axle or the vehicle is greater than the predetermined speed.

13. The vehicle as claimed in claim 12, further comprising an anti-lock braking system (ABS) which has a speed sensor system or a velocity sensor system configured to determine the speed of the first wheel or the first axle.

14. The vehicle as claimed in claim 12, wherein the vehicle is configured as a lorry.

15. The vehicle as claimed in claim 12, wherein the speed of the speed of the second wheel or the second axle is synchronized with the speed of the first wheel or the first axle or a speed of the vehicle independent of a position of the accelerator pedal.

* * * * *